US012417636B2

(12) United States Patent
Ramanathan et al.

(10) Patent No.: US 12,417,636 B2
(45) Date of Patent: Sep. 16, 2025

(54) USING IMPLICIT EVENT GROUND TRUTH FOR VIDEO CAMERAS

(71) Applicant: ObjectVideo Labs, LLC, Tysons, VA (US)

(72) Inventors: Narayanan Ramanathan, Chantilly, VA (US); Allison Beach, Leesburg, VA (US); Gang Qian, McLean, VA (US); Kyoung-Jin Park, Ellicott City, MD (US); Donald Gerard Madden, Columbia, MD (US); Ethan Shayne, Clifton Park, NY (US)

(73) Assignee: ObjectVideo Labs, LLC, Tysons, VA (US)

( * ) Notice: Subject to any disclaimer, the term of this patent is extended or adjusted under 35 U.S.C. 154(b) by 0 days.

(21) Appl. No.: 18/235,918

(22) Filed: Aug. 21, 2023

(65) Prior Publication Data
US 2024/0071083 A1    Feb. 29, 2024

Related U.S. Application Data

(60) Provisional application No. 63/400,932, filed on Aug. 25, 2022.

(51) Int. Cl.
*G06V 20/52* (2022.01)
*G06V 10/25* (2022.01)
*G06V 10/74* (2022.01)
*G06V 20/40* (2022.01)

(52) U.S. Cl.
CPC ............. *G06V 20/52* (2022.01); *G06V 10/25* (2022.01); *G06V 10/761* (2022.01); *G06V 20/44* (2022.01); *G06V 2201/07* (2022.01)

(58) Field of Classification Search
CPC ...... G06V 20/52; G06V 10/25; G06V 10/761; G06V 20/44; G06V 2201/07
See application file for complete search history.

(56) References Cited

U.S. PATENT DOCUMENTS

| 11,294,971 | B1 * | 4/2022 | Gokhan | G06F 16/951 |
|---|---|---|---|---|
| 2019/0205630 | A1 * | 7/2019 | Kusens | A61B 5/6891 |
| 2020/0042776 | A1 * | 2/2020 | Shen | G06V 10/82 |
| 2021/0158048 | A1 * | 5/2021 | Lee | G06F 18/22 |
| 2021/0343027 | A1 * | 11/2021 | Huang | G06T 7/74 |
| 2022/0019810 | A1 * | 1/2022 | Farber | H04N 7/18 |
| 2023/0377170 | A1 * | 11/2023 | Kuo | G06T 7/254 |

\* cited by examiner

*Primary Examiner* — Tracy Y. Li
(74) *Attorney, Agent, or Firm* — Fish & Richardson P.C.

(57) ABSTRACT

Methods, systems, and apparatus, including computer programs encoded on computer storage media, for object detection. One of the methods includes determining, using first sensor data, a detection result on whether to trigger an event alerting a presence of an object in a target area by executing one or more models; determining, using second sensor data, a ground truth for the event that indicates whether an object is present in the target area; determining a difference value by comparing the detection result and the ground truth; adjusting at least one parameter of the one or more models in response to determining that the difference value does not satisfy the one or more threshold criteria; and determining a new detection result on whether to trigger a second event by executing the one or more models with adjusted parameters using new first sensor data.

20 Claims, 4 Drawing Sheets

USING IMPLICIT EVENT GROUND TRUTH FOR VIDEO CAMERAS

CROSS-REFERENCE TO RELATED APPLICATION

This application claims the benefit of U.S. Provisional Application No. 63/400,932, filed Aug. 25, 2022, the contents of which are incorporated by reference herein.

BACKGROUND

Monitoring systems can monitor properties and respond to detected activities. For example, monitoring systems can detect motion and whether doors and windows open. Monitoring systems can take actions to deter unwelcome visitors, such as turning on lights and playing alarm audio. Monitoring systems can additionally provide notifications to users about detected activities.

SUMMARY

In general, innovative aspects of the subject matter described in this specification can be embodied in methods that include the actions of receiving, by one or more computing devices, first sensor data collected by one or more first sensors of a monitoring system; determining, by the one or more computing devices and using the first sensor data, a detection result on whether to trigger an event alerting a presence of an object in a target area by executing one or more models of an object detection process; receiving, by the one or more computing devices, second sensor data from one or more second sensors of the monitoring system; determining, by the one or more computing devices and using the second sensor data, a ground truth for the event that indicates whether an object is present in the target area; determining, by one or more computing devices, a difference value representing a degree of accuracy of the one or more models for the event by comparing the detection result and the ground truth; determining, by the one or more computing devices, whether the difference value satisfies one or more threshold criteria; adjusting, by the one or more computing devices, at least one parameter of the one or more models in response to determining that the difference value does not satisfy the one or more threshold criteria; and determining, by the one or more computing devices, a new detection result on whether to trigger a second event by executing the one or more models with adjusted parameters using new first sensor data.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations, the method can include in response to determining to trigger the event using the first sensor data, triggering the event before at least one of adjusting the at least one parameter of the one or more models, determining the ground truth for the event using the second sensor data, determining the difference value, or determining whether the difference value satisfies the one or more threshold criteria.

In some implementations, the method can include determining whether to adjust at least one of the models using a first timestamp of the triggering of the event and a second timestamp of the ground truth; and adjusting at least another parameter of the one or more models using the first timestamp of the triggering of the event and the second timestamp of ground truth.

In some implementations, the method can include adjusting at least the other parameter of the one or more models using a difference between the first timestamp of the triggering of the event and the second timestamp of ground truth.

In some implementations, the method can include determining, by one or more computing devices, a second difference value representing a degree of accuracy of the one or more models by comparing i) a detection result for a second event determined using third sensor data captured by a sensor of the monitoring system and ii) a ground truth for the second event determined using fourth sensor data captured by another sensor of the monitoring system; determining, by the one or more computing devices, whether the second difference value satisfies the one or more threshold criteria; and determining to skip adjusting the at least one parameter of the one or more models in response to determining that the second difference value satisfies the one or more threshold criteria.

In some implementations, the one or more first sensors of the monitoring system can include at least one of a camera and a motion detector, and the one or more second sensors can include at least one of a camera, a motion detector, a doormat, a button, an audio sensor, a glass break sensor, a pressure sensor, a distance sensor, a door open sensor, a doorbell, or a passive infrared (PIR) sensor.

In some implementations, determining the detection result can include: comparing the first sensor data with an object data to determine whether the first sensor data satisfies a similarity threshold for the object; and in response to determining that the first sensor data satisfies the similarity threshold, determining that the object is present in the target area and determining to trigger the event.

In some implementations, determining the detection result can include: comparing the first sensor data with background image data to determine whether a difference satisfies a threshold; and in response to determining that the difference satisfies the threshold, determining that an object is present in the target area and determining to trigger the event.

In some implementations, determining whether the difference value satisfies the one or more threshold criteria can include: determining whether a first timestamp for the event satisfies a timing threshold for a second timestamp of the ground truth, the timing threshold representing an acceptable range of time for trigger the event.

In some implementations, determining, using the first sensor data, the detection result can include performing two or more actions to generate the detection result; and adjusting at least the one parameter of the one or more models can include adjusting at least the one parameter of the one or more models using a first timestamp for a particular action from the two or more actions and a second timestamp for the ground truth.

In some implementations, determining whether the difference value satisfies one or more threshold criteria can include determining whether the first timestamp of the particular action from the two or more actions does not satisfy the one or more threshold criteria compared to the second timestamp of the ground truth; and adjusting at least the one parameter of the one or more models can include adjusting one or more parameters of a model using data for the particular action.

In some implementations, adjusting the one or more parameters of the model can include: selecting a model that performed the particular action; and adjusting the one or more parameters of the model that performed the particular action.

The subject matter described in this specification can be implemented in various implementations and may result in one or more of the following advantages. In some implementations, video camera event detection can be customized for a monitored scene by balancing detection accuracy and detection latency, e.g., to either increase the accuracy or decrease the latency. In some implementations, a trigger accuracy for a camera, e.g., a video doorbell, can be improved by adjusting parameters or skipping a parameter adjustment given ground truth analysis. In some implementations, timestamps of when events occur can provide additional context to the events detected by a monitoring system, e.g., improving performance of the monitoring system. In some implementations, power usage can be reduced by using lower power sensors to wake up higher power sensors. In some implementations, power usage can be reduced by determining to skip triggering an alert. In some implementations, performance evaluation of a monitoring system can be improved using available data points without the need to collect additional data. In some implementations, video camera event detection can be improved without the need to replace any hardware or install additional hardware by evaluating the monitoring system using data collected from existing data inputs.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Monitoring systems can detect people approaching and standing at a door. The monitoring systems can detect packages delivered to a property, and when the packages are subsequently retrieved. In some implementations, monitoring systems can include doorbell cameras, and can be included in doorbell applications, doorbell devices, or a combination of these.

Events reported by a doorbell camera may invoke a near immediate response from a user, e.g., an occupant of the property. For example, the user may attend to the event by opening the door to individuals at the doorstep, retrieving the package(s) delivered, or a combination of these. Sometimes, monitoring systems incorrectly detect events. Domain-based challenges can result in false positives, e.g., false event alerts, delayed reporting of events, false negatives, e.g., failure to detect certain events, or a combination of these. The user experience may be negatively impacted by false or delayed event reporting.

Events detected by some sensors, such as doorbell cameras, can be accompanied by implicit ground truth on the event. The implicit ground truth can be determined from an action performed by a person. For example, a person approaching the door step, e.g. to deliver a package, will ring the doorbell in most instances, letting the home owner know of his or her arrival. A timestamp at which the doorbell was rung can provide an implicit timeline of when the event of a person approaching the doorstep happened. An accuracy of monitoring systems, e.g., doorbell analytics solutions, can be improved using implicit event ground truth data.

Figure 1:
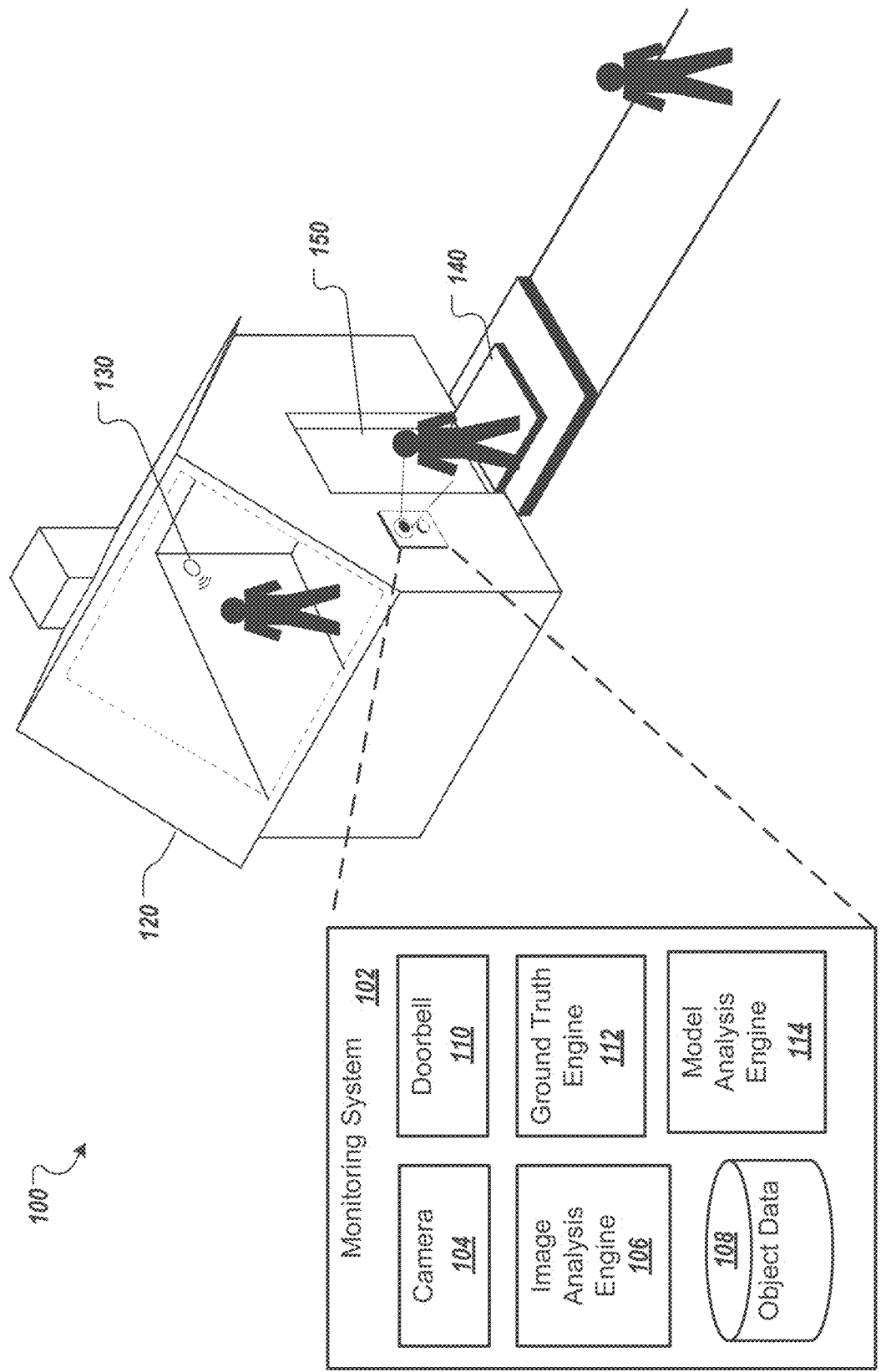
FIG. 1 depicts an example environment for improving video camera event detection.

FIG. 1 depicts an example environment 100 for improving video camera event detection. The environment 100 can include a monitoring system 102 for monitoring a property 120. In some implementations, a property type of property 120 can include a residential or commercial property. For example, the property type can include a primary residence, vacation home, rental property, or business. In some implementations, the monitoring system 102 can be located at the property 120 or at another location.

The monitoring system 102 can include a camera 104. The camera 104 can capture data about the property 120. For example, the camera 104 can capture images, video, audio, or a combination of these. In some examples, the camera 104 can be a doorbell camera. In some implementations, the data can include a representation of an object and/or an activity. For example, the data can include a video of a visitor approaching the entrance 150 when the camera 104 has a field of view that includes a target area, such as an area near the entrance 150. In some examples, the data can include an image of a face of a visitor.

The monitoring system 102 can include an image analysis engine 106. The image analysis engine 106 can include one or more models as part of an object detection process. The one or more models can include one or more neural networks. For example, the one or more models can include a cascade of neural networks.

Figure 2:
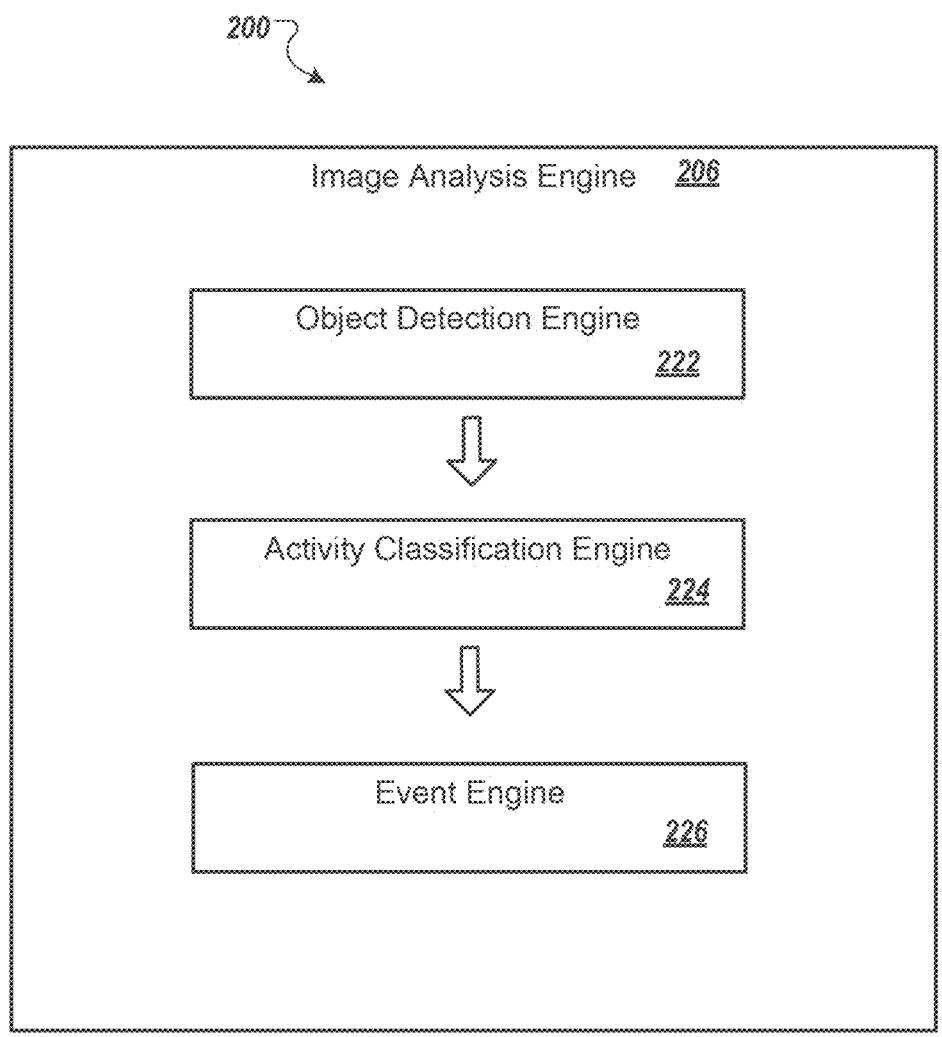
FIG. 2 depicts an example environment for image analysis.

FIG. 2 depicts an example environment 200 for image analysis. The environment 200 can include an image analysis engine 206. In some implementations, the image analysis engine 206 can be the same as or similar to the image analysis engine 106 of FIG. 1. The image analysis engine 206 can include object detection engine 222, activity classification engine 224, and event engine 226. In some implementations, the engines 222-226 can be the same as or similar to the one or more models of image analysis engine 106. In some implementations, an output of one or more of the engines 222-226 can be fed as an input to one or more of the engines 222-226. An output of the object detection engine 222 can be fed forward as an input to the activity classification engine 224, and an output of the activity classification engine 224 can be fed forward as an input to the event engine 226.

Returning to FIG. 1, the image analysis engine 106 can use first sensor data as input. For example, the first sensor data can be images received from camera 104. The image analysis engine 106 can compare first sensor data to object data 108, or use a model to determine whether the first sensor data satisfies a similarity threshold for the object data 108 when the model was trained using the object data 108. In response to determining that the first sensor data satisfies the similarity threshold, the monitoring system can determine that the object is present in the target area and determine to trigger an event alerting the presence of the object. In the latter instance, the monitoring system 102 might not include the object data 108 with which the model was trained. For example, the object data 108 can include a background image without detectable objects present. In such an example, the background image can depict the doormat 140.

The image analysis engine 106 can determine if an object is likely present. In some implementations, a first model of the process, e.g., the object detection engine 222, can determine whether the object is likely present. In these implementations, the object detection engine 222 can use the first sensor data as input. The image analysis engine 106 can determine if an object is likely present by determining whether the first sensor data does not match the background image. For example, image analysis engine 106 can determine if a difference between the first sensor data and the background image satisfies a threshold. In response to determining that the difference satisfies the threshold, the monitoring system can determine that an object is present in the target area and determine to trigger the event. For example, the image analysis engine 106 can determine an object is likely present if the doormat 140 is obstructed.

In some implementations, the first sensor data can be received from a motion detector. In such implementations, the image analysis engine 106 can determine an object is likely present if motion is detected in the vicinity of the monitoring system 102.

In some implementations, the image analysis engine 106 can determine an object type of a detected object. In some implementations, the image analysis engine 106 can determine the object type using the one or more models of the object detection process. In some implementations, the image analysis engine 106 can use the first model, e.g., object detection engine 222, to determine the object type. For example, the first model can output an object type if an object is likely present, or an indication that no object is likely present. In some examples, the object type can include a person, vehicle, package, animal, plant, shadow, or a combination of these, e.g., when multiple objects are detected. In some implementations, the image analysis engine 106 can determine a confidence that the object is of the corresponding object type, e.g., a person.

The image analysis engine 106 can determine whether one or more activities involving the object likely occurred, e.g., in response to the image analysis engine 106 detecting an object or an object of one or more predetermined types. In some implementations, the image analysis engine 106 can determine the one or more activities using the one or more models of the object detection process. For example, the image analysis engine 106 can use a second model, e.g., the activity classification engine 224, to determine the one or more activities. In some examples, the one or more activities can include an object approaching the property 120, an object approaching entrance 150, an object moving away from the entrance 150, a delivery, ringing doorbell 110, knocking on a door of entrance 150, opening a door of entrance 150, entering the property 120, loitering, a delay in taking an action, or a combination of these. In some examples, the image analysis engine 106 can use image data from camera 104 to determine a package is resting on doormat 140. In some examples, the image analysis engine 106 can determine a person is approaching a front door.

In some implementations, the image analysis engine 106 can determine the activity using first sensor data. For example, camera 104 can capture one or more first images of a person. In such an example, the image analysis engine 106 can determine whether the person is likely approaching the entrance 150. In some implementations, the image analysis engine 106, e.g., activity classification engine 224, can determine the activity using an output of the first model. In some implementations, the image analysis engine 106, e.g., activity classification engine 224, can include a person tracker. In such implementations, the person tracker can determine whether an object, e.g., person, is moving toward the entrance 150. In some examples, the image analysis engine 106 can determine that a person is walking past property 120 on a sidewalk. In some examples, the image analysis engine 106 can determine that a vehicle is driving past property 120.

The image analysis engine 106 can determine a detection result on whether to trigger an event using the one or more models of the object detection process. In some implementations, a third model, e.g., event engine 226, of the object detection process can determine whether to trigger an event using an output of a second model as an input. For example, the third model can determine whether to trigger the event using the activity determined by the second model. In some implementations, the image analysis engine 106 can determine to trigger the event if an object, e.g., a person, is approaching property 120, e.g., entrance 150. In some implementations, the image analysis engine 106 can determine not to trigger an event if an object is not approaching property 120, e.g., the object moves tangentially to property 120, the object moves away from property 120.

The image analysis engine 106 can determine the event corresponding to the detected activity, e.g., different events can be triggered for different detected activities. For example, the image analysis engine 106 can use the third model, e.g., the event engine 226, to determine the event. In some implementations, the triggered event can include transmitting an alert for a user, e.g., the owner of property 120. For example, the alert can indicate the arrival of a person at the doorstep of entrance 150.

In some implementations, the event can include providing a notification to the user through user interface 130 of property 120. The user interface 130 can be auditory, visual, tactile, or a combination of these. For example, the user interface can include one or more speakers, screens, lights, user devices, vibrating devices, or a combination of these. In some examples, one or more lights can brighten, dim, flash, or a combination of these. In some examples, the notification can include a message, e.g., Short Message Service, email, instant message. In some implementations, the event can include ringing a bell through user interface 130 when the movement of a person satisfies a threshold criteria. In such implementations, the threshold criteria can be satisfied when a probability that the person will enter a doorstep region of entrance 150 is greater than the threshold criteria. For example, the probability can be determined using the position and velocity of the person at different points in time.

In some implementations, triggering the event can include the image analysis engine 106 determining a visual alert. The visual alert can include a video clip and/or image captured before the event was triggered. For example, the visual alert can include a detected object, e.g., person. In some implementations, triggering the event can include the image analysis engine 106 determining to perform facial recognition. In such implementations, the visual alert can include information identifying the detected person, e.g., a stored name of the detected person.

In some implementations, triggering the event can include transmitting data to one or more servers, e.g., a cloud computing environment. The data can include the first sensor data, the output from the one or more models of image analysis engine 106, e.g., the engines 222-226, or a combination of these. For example, the image analysis engine 106 can transmit the visual alert to the one or more servers. In some implementations, the one or more servers can transmit a notification to the user, e.g., property owner. For example, the one or more servers can transmit the visual alert to a user device.

The monitoring system 102 can include a ground truth engine 112. The ground truth engine 112 can determine a ground truth for training the image analysis engine 106, or one or more models included in the image analysis engine 106. The ground truth can represent a highly likely presence, e.g., close to 100% certainty, of an object. The ground truth can include a likely object location, object type, activity classification, or a combination of these. In some implementations, the ground truth can be an implicit proof of an expected alert that results from detection of the object location, the object type, the activity classification, or a combination of these. In such implementations, the implicit proof of the expected alert can be used by the model analysis engine 114, as described in further detail below.

The ground truth engine 112 can determine the ground truth using data received from one or more sensors. In some implementations, the one or more sensors can be included in monitoring system 102. In some implementations, the one or more sensors can be communicably coupled to the monitoring system 102, e.g., over one or more networks. In such implementations, the one or more sensors can communicate with the ground truth engine 112 wirelessly, through a wired connection, or a combination of these. In some implementations, the ground truth can be determined in response to receiving a signal from the one or more sensors.

In some implementations, the ground truth engine 112 can determine the ground truth using data from the doorbell 110. The ground truth engine 112 can receive a signal from the doorbell 110 when a physical button is pushed. For example, the ground truth can indicate that a person is likely located at the entrance 150. In some implementations, the monitoring system 102 can include the doorbell 110.

In some implementations, the ground truth engine 112 can use data captured by the one or more sensors, e.g., the camera 104, and actions performed by the monitoring system 102 to determine the ground truth. As the monitoring system 102 performs various actions, certain ones of the actions can be validated by later actions. Since the monitoring system 102 might have a lower confidence initially about performing some of these actions, the ground truth engine 112 can use the later actions that validate the earlier actions, to increase the confidence for the earlier actions. This can result in the monitoring system 102 having a higher accuracy of detecting activities using data from the one or more sensors. In some examples, the monitoring system 102 can have a first, lower accuracy that a person is approaching the doorbell 110. The monitoring system 102 can determine to generate an alert about the person approaching the doorbell 110 as a first action. When the monitoring system 102 detects a physical triggering of the doorbell 110, the monitoring system 102 can activate a doorbell alert, e.g., in the property 120 or on a mobile device. This doorbell alert activation can be a second action. The ground truth engine 112 can use this second action to increase the confidence the monitoring system 102 had to perform the first action.

In some implementations, the ground truth engine 112 can determine the ground truth and a confidence of the ground truth using the data received from the one or more sensors. In some implementations, the confidence of the ground truth can indicate that an object, e.g., person, package, animal, is likely performing a certain activity, located at a particular area of the property 120, or both. For instance, the confidence can indicate whether an object is located in a doorstep area of the entrance 150, e.g., near a front door. In some implementations, the ground truth engine 112 can determine the confidence as a likelihood that an object is detected by analyzing the data received from the sensor. In some implementations, the ground truth engine 112 can determine the confidence of the ground truth using a confidence received from the sensor, e.g., a likelihood of object detection.

In some implementations, the confidence of the ground truth can be sensor specific. In some implementations, the confidence can be determined using the data received from the one or more sensors. In some implementations, a confidence for a sensor can indicate a likely accuracy of the sensor. In some implementations, the confidence can be determined using information about the one or more sensors. For example, the confidence of the ground truth can be determined using a confidence of the sensor which the data is received from. In some implementations, a confidence of a sensor can be predetermined, e.g., received during hardware initialization, received through a software update. For example, the ground truth engine 112 can determine data received from certain sensors, e.g., doorbell 110, doormat 140, is highly likely, i.e., close to 100% certainty, to indicate a ground truth.

In some implementations, the ground truth engine 112 can determine a ground truth using data received from two or more sensors. In some implementations, the ground truth can be determined, e.g., calculated, by weighting the data received from each sensor, e.g. using a weighted sum. For example, the weight can be can be a value between zero and one determined using a confidence of each sensor, e.g. a weight of 0.5 can correspond to a 50% confidence. The confidence of the ground truth can be determined using a combination of the confidence of each sensor and a determination for each sensor. The determination for each sensor can be whether the data from the sensor indicates that the ground occurred or not. In such examples, the determination can be represented as true, false, zero, one, or a combination of these. In some implementations, the ground truth engine 112 can multiply a weight for each sensor with a determination for each sensor, and add the weighted determinations for the two or more sensors.

In some implementations, the ground truth engine 112 can determine the ground truth in response to receiving data from the doormat 140. For example, the data can include a signal that an object is pushing down on the doormat 140. In some implementations, the doormat 140 can be a special pressure-sensitive doormat including a pressure sensor. In some examples, the data received from the doormat 140 can include an amount of applied force. In such examples, the ground truth engine 112 can determine a weight of an object on top of the doormat 140. In some examples, the monitoring system 102 can determine that a person is likely standing on the doormat 140 using the data received from the doormat 140, the weight of the object, or a combination of these. In some examples, the monitoring system 102 can determine that a package is likely resting on the doormat 140 using the data received from the doormat 140, the weight of the object, or a combination of these.

In some implementations, the doormat 140 can trigger an awake state for the monitoring system 102, the camera 104, or a combination of these. For example, the monitoring system 102, the camera 104, or both, can be in a sleep state saving power, e.g., whether battery or direct current powered. When the doormat 140 detects at least a threshold amount of pressure, the doormat 140 can send a signal to the monitoring system 102, the camera 104, or both, e.g., depending on which components are in the sleep state. The signal can cause the receiving component, e.g., the monitoring system 102, the camera 104, or both, to wake and use more power for analysis, e.g., to capture images or analyze sensor data or both. In some examples, the doormat 140 can include a battery. The doormat 140 can provide power through a wired connection to monitoring system 102, camera 104, or a combination of these, e.g., as part of the signal. In some implementations, a battery of the doormat 140 can be recharged using power generated when people step onto doormat 140.

In some implementations, the ground truth engine 112 can determine a timestamp of the ground truth. In some implementations, the timestamp can include a time when the data is received from the one or more sensors. In some implementations, the timestamp can include a time when the one or more sensors detect the ground truth. For example, the timestamp can include a time when the doorbell 110 is rung. Use of the timestamps is described in more detail below.

The monitoring system 102 can include model analysis engine 114. The model analysis engine 114 can analyze the performance of the image analysis engine 106. In some implementations, the analysis can be performed in response to determining a ground truth. In some implementations, the model analysis engine 114 can determine whether the output of the image analysis engine 106 conflicts with the ground truth. For example, the image analysis engine 106 may fail to detect an object using the data received from a target sensors. Table 1, below, lists the possible scenarios for object and/or activity detection from a target sensor and the ground truth.

TABLE 1

Target Sensor vs Ground Truth scenarios

| | | Ground Truth | |
|---|---|---|---|
| | | Detection | No Detection |
| Target Sensor | Detection | Correct | False Positive or Discrepancy |
| | No Detection | False Negative | Correct |

When the target sensor and the ground truth agree, e.g., both indicate a detection or no detection, the model analysis engine 114 can determine that the target sensor is correct. For example, the image analysis engine 106 can detect a person using data received from camera 104, and the ground truth engine 112 can receive a signal that the person pressed doorbell 110. In these instances, the model analysis engine 114 can determine to skip updating a model in the image analysis engine 106.

When the ground truth detects an object and/or activity, but data from the target sensor indicates no detection, the model analysis engine 114 can determine that a false negative occurred, e.g., the initial assessment from monitoring system 102 is incorrect. For example, the ground truth engine 112 received a signal that the doorbell 110 was pressed, but the image analysis engine 106 did not detect any object and/or activity.

When the target sensor detects an object and/or activity, but no ground truth is determined, the model analysis engine 114 can determine that there is a discrepancy. For example, the image analysis engine 106 can detect that a person approached the entrance 150, but the person did not step on doormat 140 or ring doorbell 110. In some implementations, the discrepancy can be flagged for user review. In some implementations, the model analysis engine 114 can determine that there is a false positive. For example, the image analysis engine 106 may be overly sensitive, and generate an alert in response to detecting a car that drove past property 120 on the street.

The model analysis engine 114 can determine whether the output of the image analysis engine 106 matches the ground truth. The model analysis engine 114 can determine whether a difference value between the output of the image analysis engine 106 and the ground truth satisfies one or more threshold criteria. In some implementations, the one or more threshold criteria can be determined using the ground truth. The model analysis engine 114 can determine whether a triggered event satisfies the one or more threshold criteria with respect to the ground truth. In some implementations, the output of the image analysis engine 106 can include a determined event to trigger, and the one or more threshold criteria can include whether the event is acceptable for a determined ground truth. For example, the model analysis engine 114 can determine whether an alert was generated in response to determining the doorbell 110 was rung, whether there was a false positive, whether there was a false negative, a timing threshold is satisfied, or a combination of these.

In some implementations, the model analysis engine 114 can determine whether a timing of triggering the event satisfies the one or more threshold criteria. The one or more threshold criteria can include a timing threshold e.g., a threshold amount of time, for triggering the event. The model analysis engine 114 can determine whether a first timestamp for the event satisfies a timing threshold for a second timestamp of the ground truth, the timing threshold representing an acceptable range of time for trigger the event. For example, the model analysis engine 114 can determine whether an event was triggered within the threshold amount of time relative to a timestamp of the ground truth. In some implementations, the timing threshold for triggering the event can be determined relative to the timestamp of the ground truth determined by ground truth engine 112. In some implementations, the one or more threshold criteria can include multiple timestamps on a timeline. In some implementations, the timing threshold included in one or more threshold criteria can indicate an acceptable range of time to trigger the event relative to the timestamp of the ground truth, e.g., before, after, the timestamp of the ground truth.

In some implementations, the model analysis engine 114 can analyze a stage of image analysis by the image analysis engine 106 relative to the time the ground truth was determined. Each stage of image analysis can correspond to an action taken during the object detection process. The model analysis engine 114 can determine when a timestamp (T) that the ground truth occurs along a timeline of actions corresponding to the monitoring system 102. For example, T can include a time at which the visitor rings the doorbell 110. In some implementations, the model analysis engine 114 can qualify event response times as optimal, suboptimal, or poor using T. In some examples, if the alert is generated at a time that satisfies a timing threshold before the person rings the doorbell, the model analysis engine 114 can determine the event response time is optimal. In some examples, if the alert is generated after the person rings the doorbell, the model analysis engine 114 can determine the event response time is poor, e.g., and the timing threshold is not satisfied. In some implementations, the model analysis engine 114 can determine two or more timestamps of one or more ground truths from one or more sensors. For example, the model analysis engine 114 can determine a first timestamp (TD) when the visitor rings the doorbell and a second timestamp ($T_M$) when sufficient weight is detected on the doormat. In some examples, the model analysis engine 114 can determine a first timestamp ($T_{M1}$) when sufficient weight is detected on the doormat and a second timestamp ($T_{M2}$) when sufficient weight is no longer detected on the doormat. The model analysis engine 114 can use a combination of these timestamps when determining whether a timing threshold is satisfied.

The model analysis engine 114 can determine that an action needs revision in response to determining that an amount of time of the action after the timestamp T of the ground truth is does not satisfy a threshold amount. In some implementations, the threshold amount is positive, e.g., the action needs revision if it occurs longer than the threshold amount after the ground truth. In some implementations, the threshold amount is zero, e.g., the action needs revision if it occurs after the ground truth. In some implementations, the threshold amount is negative, e.g., the action needs revision if it does not occur fast enough before the ground truth.

In some implementations, determining the detection result of the monitoring system can include determining a timeline of actions, with each action associated with a respective timestamp. For example, the timeline of actions can include a timestamp ($t_1$) of when motion is detected, a timestamp ($t_2$) of when a person is detected, a timestamp ($t_3$) of when a person is determined to be moving toward the entrance 150, a timestamp ($t_4$) of when a visual alert is determined, a timestamp ($t_5$) of when the visual alert is transmitted to the end user, a timestamp ($t_6$) of when the end user receives the visual alert, or any combination of these. In some implementations, timestamps $t_1$-$t_3$ can correspond to when the object and/or activity is detected by one or more sensors. In some implementations, timestamps $t_1$-$t_3$ can correspond to when the image analysis engine 106 received data from one or more sensors.

In some implementations, the model analysis engine 114 can determine whether the timestamp of a particular action from the timeline actions satisfies the one or more threshold criteria compared to the timestamp of the ground truth. For example, the model analysis engine 114 can determine whether the timestamp $t_6$ of when the user receives the visual alert is before the timestamp T of the ground truth. For example, if $t_6$ is before T, then the model analysis engine 114 can determine that the output of the image analysis engine 106 satisfies the one or more threshold criteria. In such an example, the model analysis engine 114 can indicate that the image analysis engine 106 works well for the scene.

In some implementations, in response to determining that the timestamp of a particular action from the timeline actions does not satisfy the one or more criteria compared to the timestamp of the ground truth, the model analysis engine 114 can adjust one or more parameters of the model using data for the particular action. For example, the model analysis engine 114 can determine whether the timestamp $t_3$ is before timestamp T of the ground truth. For example, if $t_3$ is after T, then the model analysis engine 114 can determine that the output of the image analysis engine 106 does not satisfy the one or more threshold criteria. In such an example, the model analysis engine 114 can indicate that one or more parameters of the analytics solution deployed on the monitoring system 102 needs to be adjusted.

The model analysis engine 114 can determine whether to adjust at least one parameter for the object detection process using a result of whether the one or more threshold criteria are satisfied. The model analysis engine 114 can adjust at least one parameter for the object detection process if the output of the image analysis engine 106 does not satisfy the one or more threshold criteria. The at least one parameter can be adjusted so that the model is more likely to predict to trigger the event, e.g., at a time that satisfies a timing threshold, in response to receiving the first sensor data. The model analysis engine 114 can determine to skip adjusting the at least one parameter if the output of the image analysis engine 106 satisfies the one or more threshold criteria.

In some implementations, adjusting the at least one parameter can include decreasing the latency of the object detection process. For example, the model analysis engine 114 can determine if the output of the image analysis engine 106 is delayed. In such an example, the model analysis engine 114 can adjust the at least one parameter so that at least one action of the object detection process completes before the timestamp T of the ground truth.

In some implementations, the model analysis engine 114 can evaluate individual components of image analysis engine 106 from a response time perspective. For example, if $t_1$ is after T, the monitoring system 102 can determine that the motion detection needs to be improved. For example, the monitoring system 102 can adjust the motion detection, e.g., a model used as part of the motion detection process, to increase the speed, e.g., at the cost of reducing the accuracy. In some examples, the monitoring system 102 can generate a recommendation to replace the motion detector if the speed cannot be increased.

In some examples, if $t_2$ is after T, the monitoring system 102 can determine to improve object detection, e.g., a model used for object detection. In such examples, the model analysis engine 114 can adjust at least one parameter of image analysis engine 106 to increase the speed of the object detection. In some examples, the model analysis engine 114 can increase the speed of the object detection by adjusting the at least one parameter of image analysis engine 106.

In some examples, if $t_3$ is after T, the monitoring system 102 can determine to improve object tracking to increase the speed of a determination of whether the object is moving toward or away from the entrance 150. The monitoring system 102 can improve object tracking by adjusting a parameter for a corresponding object tracking model.

In some examples, if $t_4$ is after T, the monitoring system 102 can determine to improve the determination of the visual alert to increase the speed to begin transmitting the visual alert. The monitoring system 102 can improve visual alerts by adjusting a parameter for a corresponding visual alert model.

In some examples, if $t_5$ is after T, the monitoring system 102 can determine that the transmission of the visual alert needs to be improved. In such examples, the monitoring system 102 can generate a recommendation to use a faster network system, communication protocol, by updating a corresponding alert generation model, or a combination of these.

In some examples, if $t_6$ is after T, the monitoring system 102 can determine that the display of the visual alert needs to be improved.

In some implementations, adjusting the at least one parameter can include adjusting the one or more threshold criteria to evaluate the output of the image analysis engine 106, to prevent overtraining, or both. For example, the sensitivity of the model analysis engine 114 can be reduced in order to skip adjusting the one or more parameters in response to one or more false positives.

In some implementations, the model analysis engine 114 can determine whether the user took an action which caused the ground truth, e.g., manually turning on motion activated lights. In some implementations, the model analysis engine 114 can determine any events that triggered before the ground truth was received. For example, the model analysis engine 114 can determine whether an alert caused the user to open the door. In some implementations, the model analysis engine 114 can determine that a scene ends when the user receives an alert in order to prevent false positives.

In some implementations, the model analysis engine 114 can adjust the at least one parameter automatically in real-time in response to determining the one or more threshold criteria are not satisfied. For example, a sensitivity of the object detection process can be increased when detections are missed and/or delayed.

The monitoring system 102 can maintain one or more updated models after adjusting the at least one parameter. The image analysis engine 106 can use the one or more updated models to determine whether to trigger further events. The image analysis engine 106 can use sensor data received after adjusting the at least one parameter as an input for the one or more updated models. In some implementations, sensor data can be provided for updating the one or more models. In some implementations, the one or more updated models can be received from an online cloud computing environment including one or more servers.

In some implementations, adjusting the at least one parameter can include online tuning and/or learning. In some implementations, one or more models can be maintained in the online cloud computing environment. The one or more online models can be tuned online by adjusting at least one online parameter, e.g., one or more online threshold criteria. In some implementations, one or more new updated models can be trained using an updated training dataset. A training dataset can be updated for a scene using the sensor data, the corresponding output of the image analysis engine, the corresponding ground truth, or any combination of these. For example, a false negative including a detected ground truth but no detection by the image analysis engine 106 can be added to the training dataset. In some implementations, updating the training dataset can include timestamps corresponding to when the data is collected. In some implementations, the updated training dataset can include video clips and/or images captured by the camera 104 when the ground truth was detected, e.g., within a threshold period of time before and/or after detecting the ground truth. For example, video can be recorded off of a buffer when the ground truth is detected.

In some implementations, the monitoring system 102 can determine a topology of the doorstep area and walkway using the ground truth, sensor data, or a combination of these. In some implementations, the location of camera 104 can affect gathering the best face signature for a scene. For example, the topology of the doorstep area can include that the monitoring system 102 is adjacent to the door whereby users walk towards the camera 104. In some examples, the topology of the doorstep area can include that the monitoring system 102 is on a side wall whereby users walk laterally from the perspective of camera 104. In some implementations, the topology can include camera 104 and doorbell 110 in different locations.

In some implementations, the monitoring system 102 can determine a topology by analyzing the sensor data after the ground truth is determined. The monitoring system 102 can look back at detection characteristics to determine the topology. The monitoring system 102 can use the ground truth and the subsequent topology understanding to identify the best analytics models to use for improved detection. In some implementations, the monitoring system 102 can determine that it is difficult to get a frontal face shot.

In some implementations, the monitoring system 102 can determine if the camera is positioned adjacent to the door or on the side on-looking the door by studying the bounding box characteristics. If bounding boxes did not change in scale, but their centroids moved in a pronounced manner, then the monitoring system 102 can determine that the camera is installed on the side on-looking the door and that visitors walk laterally, e.g., from left to right, with respect to the camera 104. In such implementations, one or more models best suited for lateral object motion may be deployed to improve detection.

In some implementations, the monitoring system 102 can determine that frontal face shots are obtainable. If the scale of the bounding box changes rapidly as the scene progresses, but the centroids don't move more than a threshold amount, then the monitoring system 102 can determine that the camera is positioned adjacent to the door and that visitors walk towards the camera 104. In such implementations, one or more models for facial recognition may be deployed to improve detection.

In some implementations, the topology can include properties of entrance 150. For example, the topology can include a number of doors of entrance 150, a type of door of entrance 150, windows of entrance 150, or a combination of these. For example, the entrance 150 can include double doors, sliding doors, or a combination of these.

In some implementations, the model analysis engine 114 can adjust the at least one parameter using the, e.g., detected, topology of the doorstep area. In some implementations, the at least one parameter can correspond to a tradeoff between latency and detection confidence. In such implementations, the at least one parameter can be adjusted to maximize the performance of the model analysis engine 114 for the topology. For example, if the topology includes a long walkway, then the at least one parameter can be adjusted to increase detection confidence and increase latency. In such an example, an object approaching the property 120 will start out small and be more difficult to detect, however, the image analysis engine 106 can have a longer duration to trigger an event before the object reaches a doorstep area. In some examples, if the topology includes a short walkway, then the at least one parameter can be adjusted to decrease detection confidence and decrease latency. In such an example, an object approaching the property 120 enters the scene a short time before reaching the doorstep area, however, the object will appear big in images captured by the camera 104.

In some implementations, the monitoring system 102 can determine that the topology includes that the monitoring system 102 faces a street. For example, the image analysis engine can detect several objects, e.g., people, vehicles, walking past the property 120. However, if no ground truth is detected by the ground truth engine 112, the monitoring system 102 can determine that none of the objects visited the property and no events need to be triggered.

In some implementations, the monitoring system 102 can determine that the topology includes that the monitoring system 102 is located in an area of poor visibility. In such implementations, the monitoring system 102 can trigger a notification for the user that alerts will be late. In some implementations, the monitoring system 102 can trigger a notification that the camera 104 should be relocated.

In some implementations, the monitoring system 102 can mark a doorstep region of entrance 150 as a region of enhanced significance. For example, the doorstep region can include the region where a visitor waits for being granted access into the house. In some examples, the doorstep region can include the region where a package is typically left behind and/or retrieved. In some implementations, when a visitor rings the doorbell 110, the output, e.g., bounding boxes, of a person detector of the image analysis engine 106 can be used to identify the visitor's foot location. The monitoring system 102 can identify the doorstep region from an assimilation of foot locations from a set of visitors across time. In some implementations, the monitoring system 102 can determine where a person will likely stand while they are waiting at the door.

In some implementations, the monitoring system 102 can determine scenes which start or end at the doorstep region. The scenes can include an object, activity, or a combination of these. Scenes which start or end at the doorstep region can be tagged as scenes which the image analysis engine 106 should detect. For example, a scene of someone entering into the property 120 can start at the end of a walkway in front of the door and end at the doorstep region.

In some implementations, the one or more models of the image analysis engine 106 can be trained to not trigger an event for scenes which do not start or end at the doorstep region. For example, when an activity detected by the image analysis engine 106 includes person detector bounding boxes that are not headed towards the doorstep, the image analysis engine 106 can determine not to trigger an event. In such an example, a motion detector and a person detector can detect the person. However, if an object tracker determines that the bounding boxes are not heading towards to the doorstep regions, then the image analysis engine 106 can determine not to report the person to the user, e.g., the visual alert need not be generated.

In some implementations, the image analysis engine 106 can detect unusual activities. In some implementations, the image analysis engine 106 can use the second model, e.g., the activity classification engine 224, to determine that an activity is unusual. In some implementations, an activity can be classified as unusual when a duration of the activity satisfies a threshold criteria. For example, an activity including a person approaching entrance 150 can be classified as unusual if the time it takes for the person to ring the door bell is significantly greater, e.g., greater than one standard deviation, than the average time it takes for a person to ring the doorbell. In such an example, the time it takes for the person to ring the doorbell can be determined as a time between a timestamp when the person is first detected, e.g., at the end of a walkway, and a timestamp when the doorbell is rung. In some implementations, the image analysis engine 106 can include a cluster algorithm to detect activity outliers. In some implementations, an activity can be classified as unusual when a certain action does not occur. For example, an activity including a person approaching property 120 can be classified as unusual if the person does not ring the doorbell.

In some implementations, the image analysis engine 106 can use the topology of the doorstep region to determine that an activity is unusual. The same action can be okay at one property, and not okay somewhere else. For example, if the doorstep region is close to the street, the image analysis engine 106 can determine that an object passing by without triggering a ground truth is not unusual. In some examples, if the camera 104 faces a side widow, the image analysis engine 106 can determine that an object passing by without triggering a ground truth is unusual.

The monitoring system 102 is an example of a system implemented as computer programs on one or more computers in one or more locations, in which the systems, components, and techniques described in this specification are implemented. The monitoring system 102 may include personal computers, mobile communication devices, and other devices that can send and receive data over a network. The network (not shown), such as a local area network ("LAN"), wide area network ("WAN"), the Internet, or a combination thereof, connects the monitoring system 102, user interface 130, and doormat 140. In some implementations, the network connects the camera 104. In some implementations, the network connects one or more servers. The monitoring system 102 may use a single server computer or multiple server computers operating in conjunction with one another, including, for example, a set of remote computers deployed as a cloud computing service.

The monitoring system 102 can include several different functional components, including the image analysis engine 106, the ground truth engine 112, and the model analysis engine 114. The image analysis engine 106, the ground truth engine 112, the model analysis engine 114, or a combination of these, can include one or more data processing apparatuses, can be implemented in code, or a combination of both. For instance, each of the image analysis engine 106, the ground truth engine 112, and the model analysis engine 114 can include one or more data processors and instructions that cause the one or more data processors to perform the operations discussed herein.

The various functional components of the monitoring system 102 may be installed on one or more computers as separate functional components or as different modules of a same functional component. For example, the image analysis engine 106, the ground truth engine 112, and the model analysis engine 114 of the monitoring system 102 can be implemented as computer programs installed on one or more computers in one or more locations that are coupled to each through a network. In cloud-based systems for example, these components can be implemented by individual computing nodes of a distributed computing system.

Figure 3:
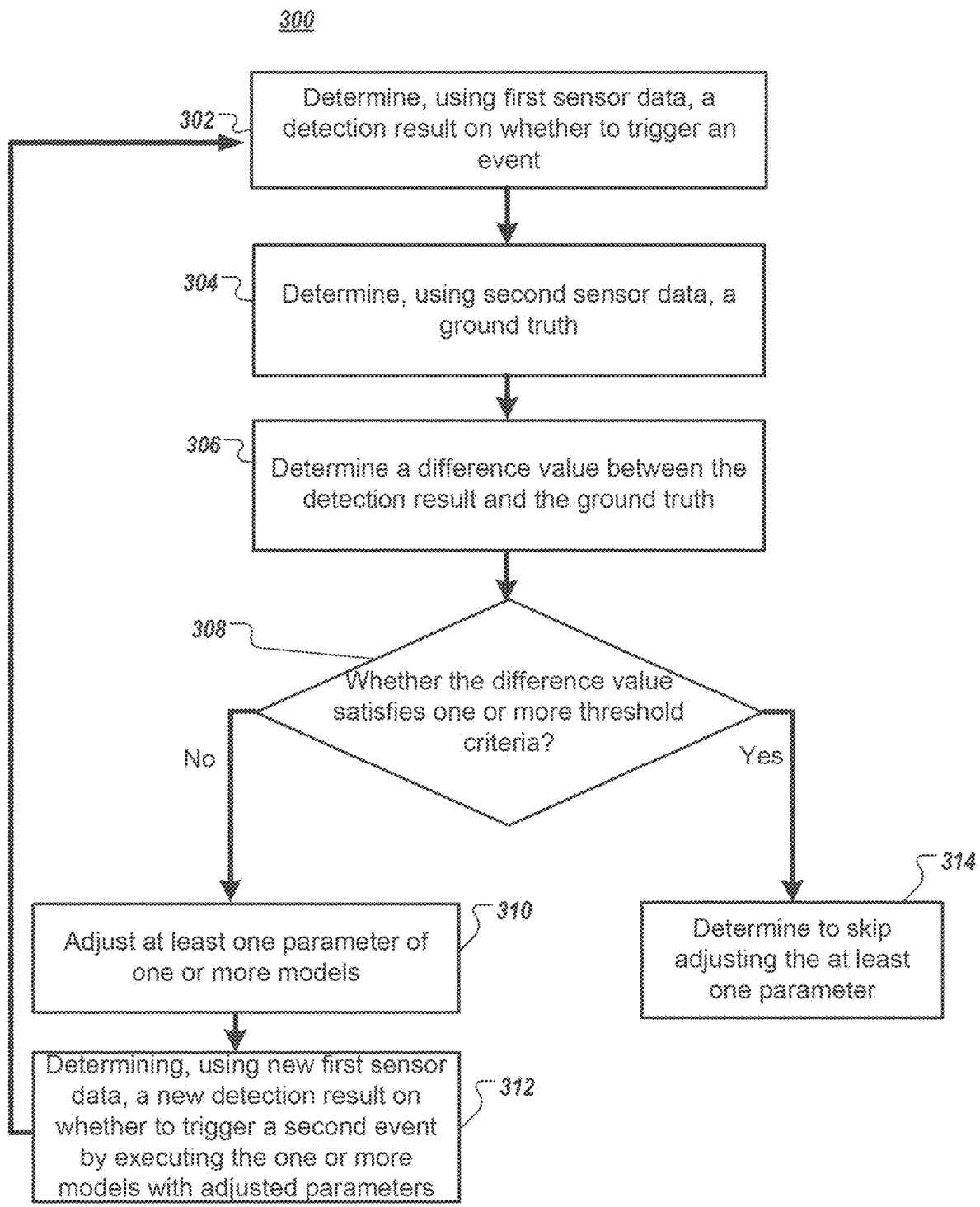
FIG. 3 is a flow diagram of a process for improving video camera event detection.

FIG. 3 is a flow diagram of a process 300 for improving video camera event detection. For example, the process 300 can be used by the monitoring system 102 from the environment 100. In some implementations, the process 300 can be performed by one or more computing devices of the monitoring system 102.

A monitoring system determine a detection result on whether to trigger an event using first sensor data collected by one or more first sensors of the monitoring system (302). The event can alert the presence of an object in a target area, such as doorstep. The monitoring system can execute one or more models of an object detection process to determine the detection result. In some implementations, the one or more models can be part of the object detection process that uses the first sensor data as input to make the determination. In some implementations, the one or more first sensors can include a camera, a motion detector, and the like. In some examples, the event can include transmitting an alert to the user to alert the presence of an object, such as a person, in the target area. In some examples, the monitoring system can determine the detection result by performing facial recognition using images captured by a camera. In such examples, the monitoring system can determine a person is approaching the front door, and the monitoring system can determine to use facial recognition to identify the person.

In some implementations, the monitoring system can determine an event to trigger using a detected activity. For example, if a detected car is determined to be driving by on the street, the monitoring system can determine to skip triggering an event.

In some implementations, the monitoring system can determine a confidence score of whether the event should be triggered. The confidence score can include a confidence, e.g., probability, of an object and/or activity detection. In some implementations, the monitoring system can determine whether the confidence score of the prediction satisfies at least one threshold criteria.

In some implementations, the confidence score can include a confidence that a detected activity is unusual. For example, the at least one threshold criteria can include an amount of time that a person usually waits at a door before taking a further action. If a person waits at the door for longer than the threshold amount of time, the monitoring system can determine the activity is unusual. The monitoring system can determine to trigger an event when an activity is determined to be unusual. In some implementations, the event can include a notification that the activity might be nefarious and/or malicious, e.g., a detected person is loitering and/or surveying the home.

The monitoring system determines a ground truth using second sensor data received from one or more second sensors (304). In some implementations, the monitoring system can determine a ground truth using feedback received from a user indicating that an activity is unusual. In some implementations, the monitoring system can determine a ground truth using second sensor data received from one or more second sensors, e.g., ground truth sensors.

In some implementations, any one or more sensors of a plurality of sensors, e.g., all the sensors at a property, can contribute to determining the ground truth and any other sensor can be analyzed to determine if a signal from the sensor needs to be adjusted, e.g., strengthened. Sensors at the property can include a doormat, a doorbell, buttons, pressure sensors, motion detectors, cameras, passive infrared (PIR) sensors, person detectors, audio sensors, glass break sensors, distance sensors, door open sensor, a plurality of any of these, or any combination of these. In some examples, the distance sensors can include Radar, Lidar, Doppler, TOF sensors, or any combination of these. In some examples, one sensor can accurately detect objects up close and other sensors can accurately detect objects at a distance. In some implementations, data from multiple sensors can be used to increase the confidence of a ground truth.

In some implementations, a PIR sensor can be included in the same hardware device as the doorbell button and doorbell camera, and can be used to wake up the doorbell camera. In some examples, the PIR sensor can be used to determine a ground truth that one or more people are standing near the front door.

In some implementations, an audio sensor can detect knocking and/or talking at an entrance. In some examples, the audio sensor can be used to determine a ground truth that one or more people are standing near the entrance. In some implementations, the monitoring system can be trained to skip triggering an event if an audio sensor detects ambient sounds, e.g., common sounds for the doorbell location.

In some implementations, probabilistic video analytics can be used to determine the ground truth. In some implementations, the monitoring system can detect gestures using data received from one or more cameras. For example, the monitoring system can detect knocking using video analysis. In some implementations, a scene may likely include one activity and/or object if another activity and/or object is detected. In some examples, a first camera can detect vehicles with a high confidence and a second camera can detect people with a high confidence. A ground truth can be determined using data from the first and second cameras in combination. If a ground truth is determined using data from one camera, the monitoring system can increase the confidence that the other camera detected a corresponding ground truth.

The monitoring system determines a difference value between the detection result and the ground truth (306). The difference value can represent a degree of accuracy of the one or more models. In some implementations, the monitoring system compares the detection result and the ground truth. For example, the monitoring system can analyze the detection result of whether to trigger the event after, e.g., in response to, determining the ground truth. For example, the monitoring system can use the ground truth to determine that an alert for unusual activity should have been triggered within a threshold period of time. The monitoring system can then determine whether the alert was actually triggered within the period of time.

The monitoring system determines whether or not the difference value satisfies one or more threshold criteria (308). As discussed above, in some implementations, the monitoring system can determine whether the timestamp for the event satisfies a timing threshold for a timestamp of the ground truth.

In response to determining the one or more threshold criteria are not satisfied, the monitoring system iteratively adjusts at least one parameter of the one or more models of the object detection process until the difference value satisfies the one or more threshold criteria (310). The at least one parameter can be adjusted so that the one or more models would predict to trigger the event more accurately using the first sensor data. For example, if the monitoring system determines the ground truth that a garage door opened, but none of the cameras at the property detected a vehicles, the monitoring system can adjust the at least one parameter of the object detection process using the cameras to be more sensitive to detecting vehicles.

In some implementations, the monitoring system can determine whether to adjust at least one of the models using a first timestamp of the triggering of the event and a second timestamp of the ground truth. The monitoring system can adjust a parameter of the one or more models using the first timestamp and the second timestamp. The monitoring system can adjust the parameter using a difference between the first timestamp and the second timestamp.

After adjusting the at least one parameter, the monitoring system can execute the one or more models with the adjusted parameters to generate a new detection result on whether to trigger a second event using new first sensor data (312). The second event may be of the same type of the event in step 302 or of a different type. An example of when they might be different is when the event in step 302 is a person walking to the door to ring the doorbell and when the second event is of a package being delivered.

The parameters of the one or more models of the object detection process can be iteratively adjusted. For example, after generating the new detection result in step 312, the process can proceed to step 302 for another iteration. During an iteration, the at least one parameter of the one or more models are adjusted, and a detection result is generated based on new first sensor data. For each iteration, a difference value is determined between the detection result and the ground truth. In some examples, if the difference value does not satisfy the one or more threshold criteria, the at least one parameter of the one or more models is adjusted in another iteration of training. In some instances, this process is repeated until the difference value satisfies the one or more threshold criteria.

In response to determining that the difference value satisfies the one or more threshold criteria, the monitoring system determines to skip adjusting at least one parameter (314). Specifically, the monitoring system can determine that the detection result is accurate and that the at least one parameter does not need to be adjusted.

The order of steps in the process 300 described above is illustrative only, and improving video camera event detection can be performed in different orders. For example, the monitoring system might determine the ground truth and then determine whether to trigger an event. In these examples, the monitoring system might determine to adjust at least one parameter for the object detection process.

In some implementations, the process 300 can include additional steps, fewer steps, or some of the steps can be divided into multiple steps. For example, the process 300 can include steps 302 through 312 without step 314. In some examples, the process 300 can include steps 302 through 308 and 314 without steps 310 and 312.

For situations in which the systems discussed here collect personal information about users, or may make use of personal information, the users may be provided with an opportunity to control whether programs or features collect personal information (e.g., images, video, facial recognition, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used.

Figure 4:
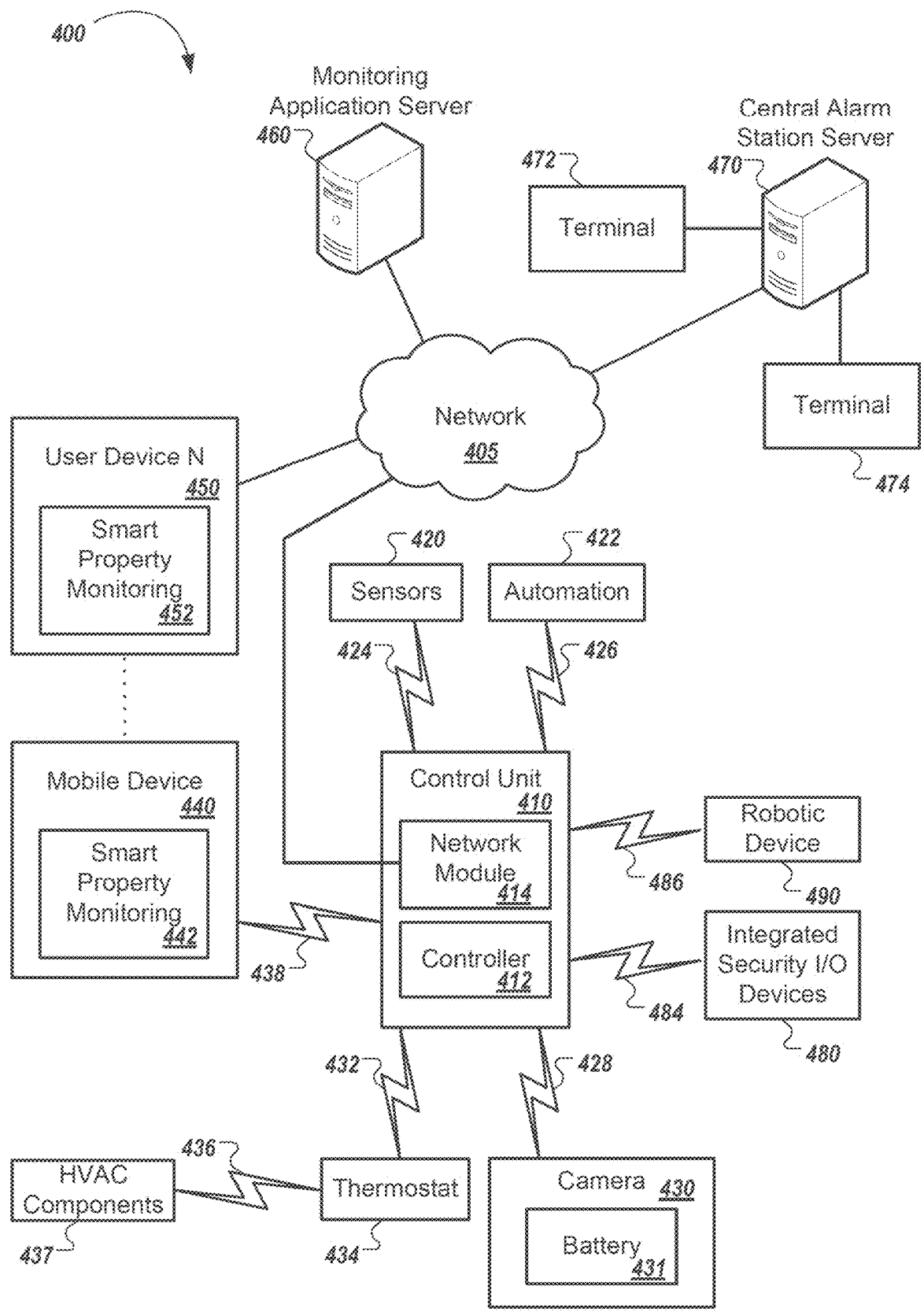
FIG. 4 is a diagram illustrating an example of a property monitoring system.

FIG. 4 is a diagram illustrating an example of a property monitoring system 400. The property monitoring system 400 includes a network 405, a control unit 410, one or more user devices 440 and 450, a monitoring application server 460, and a central alarm station server 470. In some examples, the network 405 facilitates communications between the control unit 410, the one or more user devices 440 and 450, the monitoring application server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system 400 may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the property. The health monitoring sensor can collect various health data, including pulse, heart-rate, respiration rate, sugar or glucose level, bodily temperature, or motion data. The sensors 420 can include a radio-frequency identification (RFID) sensor that identifies a particular article that includes a pre-assigned RFID tag.

The control unit 410 communicates with the module 422 and a camera 430 to perform monitoring. The module 422 is connected to one or more devices that enable property automation, e.g., home or business automation. For instance, the module 422 may be connected to one or more lighting systems and may be configured to control operation of the one or more lighting systems. Also, the module 422 may be connected to one or more electronic locks at the property and may be configured to control operation of the one or more electronic locks (e.g., control Z-Wave locks using wireless communications in the Z-Wave protocol). Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the control unit 410. For instance, the module 422 may cause a lighting system to illuminate an area to provide a better image of the area when captured by a camera 430. The camera 430 can include one or more batteries 431 that require charging.

A drone 490 can be used to survey the electronic system 400. In particular, the drone 490 can capture images of each item found in the electronic system 400 and provide images to the control unit 410 for further processing. Alternatively, the drone 490 can process the images to determine an identification of the items found in the electronic system 400.

The camera 430 may be a video/photographic camera or other type of optical sensing device configured to capture images. For instance, the camera 430 may be configured to capture images of an area within a property monitored by the control unit 410. The camera 430 may be configured to capture single, static images of the area or video images of the area in which multiple images of the area are captured at a relatively high frequency (e.g., thirty images per second) or both. The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries, e.g., if located remotely from the control unit 410. The camera 430 may employ a small solar cell to recharge the battery when light is available. The camera 430 may be powered by the controller's 412 power supply if the camera 430 is co-located with the controller 412.

In some implementations, the camera 430 communicates directly with the monitoring application server 460 over the Internet. In these implementations, image data captured by the camera 430 does not pass through the control unit 410 and the camera 430 receives commands related to operation from the monitoring application server 460.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property and/or environmental data at a property, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more module 422.

A module 437 is connected to one or more components of an HVAC system associated with a property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in security monitoring. For example, the robotic devices 490 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a property. In these examples, the robotic devices 490 include sensors and control processors that guide movement of the robotic devices 490 within the property. For instance, the robotic devices 490 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the property and guide movement of the robotic devices 490 in a manner that avoids the walls and other obstacles.

In addition, the robotic devices 490 may store data that describes attributes of the property. For instance, the robotic devices 490 may store a floorplan and/or a three-dimensional model of the property that enables the robotic devices 490 to navigate the property. During initial configuration, the robotic devices 490 may receive the data describing attributes of the property, determine a frame of reference to the data (e.g., a property or reference location in the property), and navigate the property based on the frame of reference and the data describing attributes of the property. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a property charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the property and users in the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the property. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the property. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the property. The robotic devices 490 may be configured to navigate to the charging stations after completion of tasks needed to be performed for the property monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the property monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the property may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the property that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive sensor data from the sensors 420 and determine whether to provide an alert to the one or more integrated security input/output devices 480.

The sensors 420, the module 422, the camera 430, the thermostat 434, and the integrated security devices 480 may communicate with the controller 412 over communication links 424, 426, 428, 432, 438, 484, and 486. The communication links 424, 426, 428, 432, 438, 484, and 486 may be a wired or wireless data pathway configured to transmit signals from the sensors 420, the module 422, the camera 430, the thermostat 434, the drone 490, and the integrated security devices 480 to the controller 412. The sensors 420, the module 422, the camera 430, the thermostat 434, the drone 490, and the integrated security devices 480 may continuously transmit sensed values to the controller 412, periodically transmit sensed values to the controller 412, or transmit sensed values to the controller 412 in response to a change in a sensed value. In some implementations, the drone 490 can communicate with the monitoring application server 460 over network 405. The drone 490 can connect and communicate with the monitoring application server 460 using a Wi-Fi or a cellular connection.

The communication links 424, 426, 428, 432, 438, 484, and 486 may include a local network. The sensors 420, the module 422, the camera 430, the thermostat 434, the drone 490 and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "HomePlug" or other "Powerline" networks that operate over AC wiring, and a Category 5 (CATS) or Category 6 (CAT6) wired Ethernet network. The local network may be a mesh network constructed based on the devices connected to the mesh network.

The monitoring application server 460 is an electronic device configured to provide monitoring services by exchanging electronic communications with the control unit 410, the one or more user devices 440 and 450, and the central alarm station server 470 over the network 405. For example, the monitoring application server 460 may be configured to monitor events (e.g., alarm events) generated by the control unit 410. In this example, the monitoring application server 460 may exchange electronic communications with the network module 414 included in the control unit 410 to receive information regarding events (e.g., alerts) detected by the control unit 410. The monitoring application server 460 also may receive information regarding events (e.g., alerts) from the one or more user devices 440 and 450.

In some examples, the monitoring application server 460 may route alert data received from the network module 414 or the one or more user devices 440 and 450 to the central alarm station server 470. For example, the monitoring application server 460 may transmit the alert data to the central alarm station server 470 over the network 405.

The monitoring application server 460 may store sensor and image data received from the monitoring system 400 and perform analysis of sensor and image data received from the monitoring system 400. Based on the analysis, the monitoring application server 460 may communicate with and control aspects of the control unit 410 or the one or more user devices 440 and 450.

The monitoring application server 460 may provide various monitoring services to the system 400. For example, the monitoring application server 460 may analyze the sensor, image, and other data to determine an activity pattern of a resident of the property monitored by the system 400. In some implementations, the monitoring application server 460 may analyze the data for alarm conditions or may determine and perform actions at the property by issuing commands to one or more of the controls 422, possibly through the control unit 410.

The central alarm station server 470 is an electronic device configured to provide alarm monitoring service by exchanging communications with the control unit 410, the one or more mobile devices 440 and 450, and the monitoring application server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring application server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more user devices 440 and 450 are devices that host and display user interfaces. For instance, the user device 440 is a mobile device that hosts or runs one or more native applications (e.g., the smart property application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart property application 442. The smart property application 442 refers to a software/firmware program running on the corresponding mobile device that enables the user interface and features described throughout. The user device 440 may load or install the smart property application 442 based on data received over a network or data received from local media. The smart property application 442 runs on mobile devices platforms, such as iPhone, iPod touch, Blackberry, Google Android, Windows Mobile, etc. The smart property application 442 enables the user device 440 to receive and process image and sensor data from the monitoring system.

The user device 450 may be a general-purpose computer (e.g., a desktop personal computer, a workstation, or a laptop computer) that is configured to communicate with the monitoring application server 460 and/or the control unit 410 over the network 405. The user device 450 may be configured to display a smart property user interface 452 that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (Ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring application server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring application server 460 may relay data received from the control unit 410 to the one or more user devices 440 and 450 through the network 405. In this regard, the monitoring application server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring application server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring application server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the module 422, the camera 430, and the robotic devices, e.g., that can include the drone 490. The one or more user devices 440 and 450 receive data directly from the sensors 420, the module 422, the camera 430, and the robotic devices and send data directly to the sensors 420, the module 422, the camera 430, and the robotic devices. The one or more user devices 440, 450 provide the appropriate interfaces/processing to provide visual surveillance and reporting.

In other implementations, the system 400 further includes network 405 and the sensors 420, the module 422, the camera 430, the thermostat 434, and the robotic devices are configured to communicate sensor and image data to the one or more user devices 440 and 450 over network 405 (e.g., the Internet, cellular network, etc.). In yet another implementation, the sensors 420, the module 422, the camera 430, the thermostat 434, and the robotic devices are intelligent enough to change the communication pathway from a direct local pathway when the one or more user devices 440 and 450 are in close physical proximity to the sensors 420, the module 422, the camera 430, the thermostat 434, and the robotic devices to a pathway over network 405 when the one or more user devices 440 and 450 are farther from the sensors 420, the module 422, the camera 430, the thermostat 434, and the robotic devices. In some examples, the system leverages GPS information from the one or more user devices 440 and 450 to determine whether the one or more user devices 440 and 450 are close enough to the sensors 420, the module 422, the camera 430, the thermostat 434, and the robotic devices to use the direct local pathway or whether the one or more user devices 440 and 450 are far enough from the sensors 420, the module 422, the camera 430, the thermostat 434, and the robotic devices that the pathway over network 405 is required. In other examples, the system leverages status communications (e.g., pinging) between the one or more user devices 440 and 450 and the sensors 420, the module 422, the camera 430, the thermostat 434, and the robotic devices to determine whether communication using the direct local pathway is possible. If communication using the direct local pathway is possible, the one or more user devices 440 and 450 communicate with the sensors 420, the module 422, the camera 430, the thermostat 434, and the robotic devices using the direct local pathway. If communication using the direct local pathway is not possible, the one or more user devices 440 and 450 communicate with the sensors 420, the module 422, the camera 430, the thermostat 434, and the robotic devices using the pathway over network 405.

In some implementations, the system 400 provides end users with access to images captured by the camera 430 to aid in decision-making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system 400 and other events sensed by the monitoring system 400 may be used to enable/disable video/image recording devices (e.g., the camera 430). In these implementations, the camera 430 may be set to capture images on a periodic basis when the alarm system is armed in an "away" state, but set not to capture images when the alarm system is armed in a "stay" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
receiving, by one or more computing devices, first sensor data collected by one or more first sensors of a monitoring system;
determining, by the one or more computing devices and using the first sensor data, a detection result on whether to trigger an event alerting a presence of an object in a target area by executing one or more models of an object detection process;
after receiving the first sensor data,
receiving, by the one or more computing devices, second sensor data from one or more second sensors of the monitoring system and that indicates an action performed by an object;
determining, by the one or more computing devices and using the second sensor data, a ground truth for the event that indicates whether an object is present in the target area and that the event actually occurred;
determining, by the one or more computing devices, a difference value representing a degree of accuracy of the one or more models for the event by comparing the detection result and the ground truth;
determining, by the one or more computing devices, whether the difference value satisfies one or more threshold criteria;
adjusting, by the one or more computing devices, at least one parameter of the one or more models in response to determining that the difference value does not satisfy the one or more threshold criteria; and
determining, by the one or more computing devices, a new detection result on whether to trigger a second event by executing the one or more models with adjusted parameters using new first sensor data.

2. The computer-implemented method of claim 1, comprising:
in response to determining to trigger the event using the first sensor data, triggering the event before at least one of adjusting the at least one parameter of the one or more models, determining the ground truth for the event using the second sensor data, determining the difference value, or determining whether the difference value satisfies the one or more threshold criteria.

3. The computer-implemented method of claim 2, comprising:
determining whether to adjust at least one of the models using a first timestamp of the triggering of the event and a second timestamp of the ground truth; and
adjusting at least another parameter of the one or more models using the first timestamp of the triggering of the event and the second timestamp of ground truth.

4. The computer-implemented method of claim 3, wherein:
adjusting at least the other parameter of the one or more models using a difference between the first timestamp of the triggering of the event and the second timestamp of ground truth.

5. The computer-implemented method of claim 1, comprising:
determining, by one or more computing devices, a second difference value representing a degree of accuracy of the one or more models by comparing i) a detection result for a second event determined using third sensor data captured by a sensor of the monitoring system and ii) a ground truth for the second event determined using fourth sensor data captured by another sensor of the monitoring system;
determining, by the one or more computing devices, whether the second difference value satisfies the one or more threshold criteria; and
determining to skip adjusting the at least one parameter of the one or more models in response to determining that the second difference value satisfies the one or more threshold criteria.

6. The computer-implemented method of claim 1, wherein:
the one or more first sensors of the monitoring system comprise at least one of a camera and a motion detector, and
the one or more second sensors comprise at least one of a camera, a motion detector, a doormat, a button, an audio sensor, a glass break sensor, a pressure sensor, a distance sensor, a door open sensor, a doorbell, or a passive infrared (PIR) sensor.

7. The computer-implemented method of claim 1, wherein determining the detection result comprises:
comparing the first sensor data with an object data to determine whether the first sensor data satisfies a similarity threshold for the object; and
in response to determining that the first sensor data satisfies the similarity threshold, determining that the object is present in the target area and determining to trigger the event.

8. The computer-implemented method of claim 1, wherein determining the detection result comprises:
comparing the first sensor data with background image data to determine whether a difference satisfies a threshold; and
in response to determining that the difference satisfies the threshold, determining that an object is present in the target area and determining to trigger the event.

9. The computer-implemented method of claim 1, wherein determining whether the difference value satisfies the one or more threshold criteria comprises:
determining whether a first timestamp for the event satisfies a timing threshold for a second timestamp of the ground truth, the timing threshold representing an acceptable range of time for trigger the event.

10. The computer-implemented method of claim 1, wherein:
determining, using the first sensor data, the detection result comprises performing two or more actions to generate the detection result; and
adjusting at least the one parameter of the one or more models comprises adjusting at least the one parameter of the one or more models using a first timestamp for a particular action from the two or more actions and a second timestamp for the ground truth.

11. The computer-implemented method of claim 10, wherein:
determining whether the difference value satisfies one or more threshold criteria comprises determining whether the first timestamp of the particular action from the two or more actions does not satisfy the one or more threshold criteria compared to the second timestamp of the ground truth; and
adjusting at least the one parameter of the one or more models comprises adjusting one or more parameters of a model using data for the particular action.

12. The computer-implemented method of claim 11, wherein adjusting the one or more parameters of the model comprises:
selecting a model that performed the particular action; and
adjusting the one or more parameters of the model that performed the particular action.

13. One or more non-transitory computer storage media encoded with instructions that, when executed by one or more computers, cause the one or more computers to perform:
receiving first sensor data collected by one or more first sensors of a monitoring system;
determining, using the first sensor data, a detection result on whether to trigger an event alerting a presence of an object in a target area by executing one or more models of an object detection process;
after receiving the first sensor data,
receiving second sensor data from one or more second sensors of the monitoring system and that indicates an action performed by an object;
determining, using the second sensor data, a ground truth for the event that indicates whether an object is present in the target area and that the event actually occurred;
determining a difference value representing a degree of accuracy of the one or more models for the event by comparing the detection result and the ground truth;
determining whether the difference value satisfies one or more threshold criteria;
adjusting at least one parameter of the one or more models in response to determining that the difference value does not satisfy the one or more threshold criteria; and
determining a new detection result on whether to trigger a second event by executing the one or more models with adjusted parameters using new first sensor data.

14. The one or more non-transitory computer storage media of claim 13, wherein the instructions, when executed by one or more computers, cause the one or more computers to perform:
determining a second difference value representing a degree of accuracy of the one or more models by comparing i) a detection result for a second event determined using third sensor data captured by a sensor of the monitoring system and ii) a ground truth for the second event determined using fourth sensor data captured by another sensor of the monitoring system;
determining whether the second difference value satisfies the one or more threshold criteria; and
determining to skip adjusting the at least one parameter of the one or more models in response to determining that the second difference value satisfies the one or more threshold criteria.

15. The one or more non-transitory computer storage media of claim 13, wherein determining whether the difference value satisfies the one or more threshold criteria comprises:
determining whether a first timestamp for the event satisfies a timing threshold for a second timestamp of the ground truth, the timing threshold representing an acceptable range of time for trigger the event.

16. The one or more non-transitory computer storage media of claim 13, wherein:
determining, using the first sensor data, the detection result comprises performing two or more actions to generate the detection result; and
adjusting at least the one parameter of the one or more models comprises adjusting at least the one parameter of the one or more models using a first timestamp for a particular action from the two or more actions and a second timestamp for the ground truth.

17. A system comprising one or more computers and one or more storage devices on which are stored instructions that are operable, when executed by the one or more computers, to cause the one or more computers to perform:
receiving first sensor data collected by one or more first sensors of a monitoring system;
determining, using the first sensor data, a detection result on whether to trigger an event alerting a presence of an object in a target area by executing one or more models of an object detection process;
after receiving the first sensor data,
receiving second sensor data from one or more second sensors of the monitoring system and that indicates an action performed by an object;
determining, using the second sensor data, a ground truth for the event that indicates whether an object is present in the target area and that the event actually occurred;
determining a difference value representing a degree of accuracy of the one or more models for the event by comparing the detection result and the ground truth;
determining whether the difference value satisfies one or more threshold criteria;
adjusting at least one parameter of the one or more models in response to determining that the difference value does not satisfy the one or more threshold criteria; and
determining a new detection result on whether to trigger a second event by executing the one or more models with adjusted parameters using new first sensor data.

18. The system of claim 17, wherein the instructions, when executed by one or more computers, cause the one or more computers to perform:
determining a second difference value representing a degree of accuracy of the one or more models by comparing i) a detection result for a second event determined using third sensor data captured by a sensor of the monitoring system and ii) a ground truth for the second event determined using fourth sensor data captured by another sensor of the monitoring system;
determining whether the second difference value satisfies the one or more threshold criteria; and
determining to skip adjusting the at least one parameter of the one or more models in response to determining that the second difference value satisfies the one or more threshold criteria.

19. The system of claim 17, wherein determining whether the difference value satisfies the one or more threshold criteria comprises:
determining whether a first timestamp for the event satisfies a timing threshold for a second timestamp of the ground truth, the timing threshold representing an acceptable range of time for trigger the event.

20. The system of claim 17, wherein:
determining, using the first sensor data, the detection result comprises performing two or more actions to generate the detection result; and
adjusting at least the one parameter of the one or more models comprises adjusting at least the one parameter of the one or more models using a first timestamp for a particular action from the two or more actions and a second timestamp for the ground truth.

* * * * *